United States Patent [19]

DiBella

[11] 3,843,678

[45] Oct. 22, 1974

[54] PROCESS FOR THE PRODUCTION OF SUBSTITUTED INDAZOLES

[75] Inventor: Eugene P. DiBella, Rochelle Park, N.J.

[73] Assignee: Tenneco Chemicals, Inc., Saddle Brook, N.J.

[22] Filed: Mar. 16, 1972

[21] Appl. No.: 235,424

Related U.S. Application Data

[63] Continuation-in-part of Ser. No. 124,472, March 15, 1971, abandoned.

[52] U.S. Cl. ............................................. 260/310 C
[51] Int. Cl. ............................................. C07d 49/18
[58] Field of Search ................................. 260/310 C

[56] References Cited
UNITED STATES PATENTS 3,705,175   12/1972   Magdanyi et al. .............. 260/310 C

OTHER PUBLICATIONS

"Beilstein's Handbuch der Organischen Chemie," 4th Ed., 2nd Supplement, Volume 23, p. 146.

Primary Examiner—G. Thomas Todd
Attorney, Agent, or Firm—Evelyn Berlow

[57] ABSTRACT

Indazoles that have the structural formula

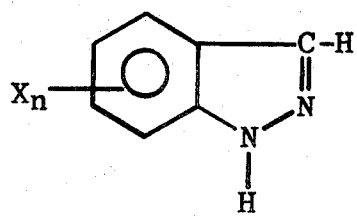

wherein X represents halogen, nitro, —$SO_2R$, cyano, acoyl, acoylamino, aroylamino, alkyl, alkoxy, carboalkoxy, —COR, —CHO, or trihalomethyl; R represents alkylamino, hydroxy, halogen, alkyl, haloalkyl, phenyl, or substituted phenyl wherein the substituent is halogen, alkyl, or nitro; and $n$ represents a number in the range of 1 to 4 are prepared by diazotizing the corresponding substituted o-toluidine in an aqueous mineral acid medium and adding the resulting diazonium salt solution to an aqueous solution containing basic anions, which is maintained at a pH of 4 to 10 and at a temperature of about 10°C. to 100°C. during the addition of the diazonium salt solution, and isolating the resulting indazole.

25 Claims, No Drawings

PROCESS FOR THE PRODUCTION OF SUBSTITUTED INDAZOLES

This is a continuation-in-part of my copending application Ser. No. 124,472, which was filed on Mar. 15, 1971 and which has been abandoned.

This invention relates to a process for the production of indazoles. More particularly, it relates to an improved process for the production of indazoles that have certain substituents on the aromatic nucleus.

The preparation of substituted indazoles from the corresponding substituted o-toluidines and related compounds via their diazo derivatives is well known. The preparation of 6-nitroindazole by the diazotization of 2-amino-4-nitrotoluene in glacial acetic acid was described by Noelting in Ber. 37, 2584 (1904). The same general procedure was used by Davies (J. Chem. Soc. 1955, 2416) in preparing a series of substituted indazoles. The preparation of 5-nitroindazole by the reaction of 2-amino-5-nitrotoluene with sodium nitrite in glacial acetic acid is described in "Organic Syntheses," 20, 72–4, New York, Wiley and Sons (1940). According to these references, yields of about 70 to 96 percent of the nitroindazoles are obtained by this procedure. This procedure is not commercially feasible, however, because it requires the use of prolonged reaction periods (3 days or more) in order to obtain maximum yields of the products. In addition large quantities of glacial acetic acid are used which must be distilled off prior to the workup of the product. A process in which an aqueous sulfuric acid solution of diazotized 2-amino-4-nitrotoluene was warmed with crystalline sodium acetate to form 6-nitroindazole was reported in Beilstein's "Handbuch der Organischen Chemie," 4th Edition, 2nd Supplement, 23, 146, but details of the process and yield data are not given.

This invention relates to an improved process for the production of substituted indazoles. This process, which can be used for the commercial production of haloindazoles, nitroindazoles, and certain other substituted indazoles, gives high yields of these products rapidly and efficiently. Unlike the previously-reported procedures which involve the handling of large volumes of reaction liquors for long periods of time, for example, ca. 7 liters total volume per mole of the o-toluidine for 3 days, the present process requires the handling of smaller volumes of liquors for much shorter reaction periods (ca. 2 liters total volume per mole of the o-toluidine for 1–2 hours). In addition, this process does not involve the handling and recovering of the copious quantities of glacial acetic acid that serve as the reaction medium.

The process of this invention can be used in the preparation of substituted indazoles that have the structural formula

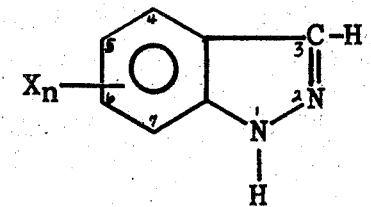

wherein X represents chlorine, bromine, iodine, fluorine, nitro, —SO₂R, cyano, acoyl, acoylamino, aroylamino, alkyl having 1 to 4 carbon atoms, alkoxy having 1 to 4 carbon atoms, carboalkoxy, —COR, —CHO, trifluoromethyl, trichloromethyl, tribromomethyl, or triiodomethyl; R represents monoalkylamino, dialkylamino, hydroxy, chlorine, bromine, fluorine, iodine, alkyl having 1 to 12 carbon atoms, chloroalkyl having 1 to 12 carbon atoms, bromoalkyl having 1 to 12 carbon atoms, fluoroalkyl having 1 to 12 carbon atoms, phenyl, chlorophenyl, bromophenyl, iodophenyl, fluorophenyl, alkylphenyl or nitrophenyl; and n represents a number in the range of 1 to 4.

Illustrative of these substituted indazoles are the following: 4-nitroindazole, 5-nitroindazole, 6-nitroindazole, 7-nitroindazole, 5,6-dinitroindazole, 4-methyl-7-nitroindazole, 5-nitro-7-butylindazole, 7-chloroindazole, 4,7-dichloroindazole, 5,7-dichloroindazole, 4,5,7-trichloroindazole, 4,5,6,7-tetrachloroindazole, 7-bromoindazole, 5,7-dibromoindazole, 4,5,6,7-tetrabromoindazole, 4,5,7-triiodoindazole, 5,7-difluoroindazole, 6-methylaminoindazole, 5,6-di(butylsulfonyl)indazole, 7-(chlorohexylsulfonyl)indazole, 7-benzenesulfonylindazole, 6-p-toluenesulfonylindazole, 6-(nitrobenzenesulfonyl)indazole, 5-cyanoindazole, 7-acetylindazole, 5,7-diacetaminoindazole, 5,7-dimethoxyindazole, 6-carbomethoxyindazole, 4,7-dicarboethoxyindazole, 4,5,7-tri(benzamino)indazole, 6-trifluoromethylindazole, 5,6-di(trichloromethyl)indazole, 5-tribromomethylindazole, 5,7-dicarboxyindazole, 6-carbonylindazole, and the like.

In the practice of this invention, a substituted o-toluidine having the structural formula

wherein X and n have the aforementioned significance is diazotized in an aqueous mineral acid reaction medium. The resulting diazonium salt solution is added to an aqueous solution of a salt of a weak acid that is maintained at a temperature between 10°C. and 100°C. and at a pH in the range of 4–10 to effect ring closure.

The indazole that precipitates is isolated, washed with water, and dried.

When the X substituent on the aromatic nucleus of the substituted o-toluidine is strongly electronegative, for example, nitro (—NO₂), ring closure is readily effected by the action of the aqueous salt solution regardless of the position of the substituent on the aromatic nucleus, the number of such substituents, and the presence of other substituents. When the substituent represented by X is either weakly electronegative or electropositive, for example, halogen or alkyl, the substituent must be in the position adjacent to the amino (—NH₂) group, that is, the 3-position of the aromatic nucleus, if a satisfactory yield of the substituted indazole is to be obtained. Particularly good results are obtained when there are two or more of these substituents on the ring. Thus, it has been found that best results are obtained when the substituted o-toluidine has either the structural formula

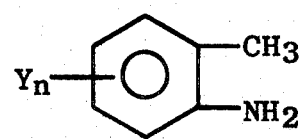

wherein Y represents a strongly electronegative substituent, such as nitro, trihalomethyl, —SO₂R, cyano, carboalkoxy, —COR, or —CHO; and n and R have the aforementioned significance, or the structural formula

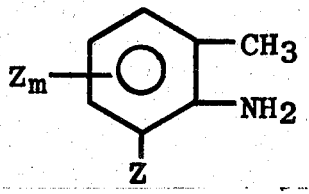

wherein each Z represents a weakly electronegative or an electropositive substituent, such as chlorine, bromine, fluorine, iodine, alkyl, alkoxy, acoyl, acoylamino, or aroylamino, and m represents a number in the range of 0 to 3, preferably at least 1.

The diazotization of the substituted o-toluidine is carried out in a conventional manner by adding an aqueous solution of sodium nitrite to a suspension containing a substantially equivalent amount of a salt of the substituted o-toluidine in an aqueous mineral acid medium at a temperature below 10°C., and preferably at 5°C. to 10°C. The suspension to which the sodium nitrite solution is added can be prepared by dissolving the substituted o-toluidine in about 2 moles to 10 moles of a concentrated mineral acid, preferably sulfuric acid, per mole of the toluidine and diluting the solution with water to form a suspension of a mineral acid salt of the o-toluidine in aqueous mineral acid. Alternatively, the suspension can be formed by heating the substituted o-toluidine at about 80°C.–100°C. with an amount of an aqueous solution containing about 10 percent to 50 percent by weight of mineral acid that provides about 1 mole to 3 moles of the acid per mole of the o-toluidine until complete solution is effected and then cooling the solution to room temperature.

The diazonium salt solution is added gradually to an aqueous solution that contains a stoichiometric excess of basic anions to effect ring closure. During the addition of the diazonium salt solution, the reaction medium is maintained at a temperature between 10°C. and 100°C. and at a pH between 4 and 10. In most cases the reaction medium is maintained at a temperature between 60°C. and 100°C. and at a pH between 5 and 9 during the addition of the salt solution, with particularly satisfactory results being obtained when the ring closure is effected at a temperature between 60°C. and 80°C. and at a pH between 5 and 8.

The aqueous solution to which the diazonium salt is added contains at least 0.3 mole of an alkali metal salt of a water soluble acid that has a dissociation constant in the range of $1 \times 10^{-8}$ to $1 \times 10^{-5}$ per mole of the diazonium salt. The solution preferably contains 1 mole to 20 moles of the alkali metal salt per mole of the diazonium salt. Suitable salts include the sodium, potassium, and lithium salts of such acids as acetic acid, propionic acid, butyric acid, and monohydrophosphoric acid. Excellent results have been obtained using a phosphate buffer system. One such system, which has a pH of 7, is prepared by mixing 30 parts by weight of 85 percent phosphoric acid with 38 parts by weight of 50 percent sodium hydroxide solution and 150 parts by weight of water.

To convert the diazonium salt to the corresponding indazole without formation of appreciable amounts of reaction by-products, the anion that is in the solution to which the diazonium salt is added should not be basic to such a degree that it would by itself or by the production of hydroxyl ions via hydrolysis lead to stable covalent bonding with the diazo group to produce a diazotate (—N=N—OH), which would not cyclize to the indazole. In addition, oxidizing and reducing anions, such as sulfite, formate, and hypochlorite ions, should not be present in the solution.

The diazonium salt solution is added to the aqueous solution containing basic anions at such a rate that an excess of basic anions is always present. In a preferred embodiment of the invention, this is accomplished by adding the diazonium salt solution to a solution that contains about 2 moles to 20 moles, and preferably 5 moles to 15 moles, of the alkali metal salt of the weak acid for each mole of the diazonium salt that is to be added. In another preferred embodiment of the invention, the diazonium salt solution is added in two or more portions to a solution that contains about 1 mole to 2 moles of the alkali metal salt for each mole of the diazonium salt that is to be added, and after the addition of each portion the alkali metal salt is regenerated by the addition of an amount of an alkaline solution that is equivalent to the acidity present in the amount of the diazonium salt solution that has been added. This can be done, for example, by adding about 20 percent to 60 percent of the diazonium salt solution to an aqueous solution that contains 1 mole to 2 moles of the alkali metal salt for each mole of the diazonium salt that is to be added, adding an amount of a solution containing sodium hydroxide, potassium hydroxide, sodium carbonate, or another alkaline compound that is equivalent to the acidity of diazonium salt solution that has been added to the reaction mixture to regenerate the alkali metal salt of the weak acid, and adding an additional portion or additional portions of the diazonium salt solution and equivalent amounts of the alkaline solution alternately or concurrently until all of the diazonium salt has been added. The same result can be achieved by adding the diazonium salt solution gradually to the aqueous alkali metal salt solution until the pH of the reaction mixture is about 6, adding aqueous sodium hydroxide solution to the reaction mixture to bring its pH to about 8, and adding the diazonium salt solution and the sodium hydroxide solution alternately in such amounts that the pH of the reaction mixture remains between about 6 and 8.

If a high yield of a product containing at least 85 percent, and preferably 93 percent to 100 percent, of the substituted indazole is to be obtained, it is necessary that the diazonium salt solution be added to the solution that contains basic anions. When the reverse process is used, that is, the solution containing basic anions is added to the diazonium salt solution, less satisfactory results are obtained, probably because competing reactions, such as nitrocresol formation and intermolecular condensation of the diazo compound with the substituted indazole or nitrocresol that has been formed, take place to an appreciable extent.

The indazole, which is usually insoluble in the hot reaction mixture, precipitates from the reaction mixture as it is formed. It is then isolated by filtration, decantation, or other known technique, washed with water until it is free of salts, and dried.

The substituted indazoles that are prepared by the process of this invention are useful as intermediates in the preparation of preservatives, dyestuffs, and pharmaceuticals. For example, they can be reacted with formaldehyde or a formaldehyde-yielding substance to form the corresponding N'-hydroxymethylindazoles, which are useful as bactericides, fungicides, and pesticides. The use of N'-hydroxymethyl-substituted indazoles as preservatives for latex paints and other aqueous compositions that are subject to deterioration resulting from bacterial action is disclosed in copending application Ser. No. 201,194, which was filed by P. P. Minieri on Nov. 22, 1971 and which has been abandoned.

The invention is further illustrated by the following examples.

EXAMPLE 1

A solution of 88 grams (0.50 mole) of 2-amino-3,5-dichlorotoluene in 300 grams (2.94 moles) of 96 percent sulfuric acid was diluted by the dropwise addition of 276 grams of water over a period of 10–15 minutes. During the addition of water, the temperature of the reaction mixture was maintained below 90°C. by means of external cooling. The resulting mixture was cooled to 5°–10°C. to obtain a suspension of the bisulfate salt of the dichlorotoluidine. This salt was diazotized by adding to it dropwise over a period of 2 hours a solution of 35 grams (0.51 mole) of sodium nitrite in 65 grams of water. During the addition of the sodium nitrite solution, the reaction mixture was vigorously agitated, and its temperature was maintained at 5°–10°C. by external cooling.

The cold diazonium salt solution was added over a period of one hour to a solution of 730 grams (8.90 moles) of sodium acetate in 2,200 grams of water, which was maintained at 65°–75°C. during the addition of the diazonium salt. Crude 5,7-dichloroindazole, a yellow-orange solid, separated from the reaction mixture. This material was isolated by filtration and then extracted with a solution of 30 grams (0.75 mole) of sodium hydroxide in 500 grams of water at 95°–100°C. The aqueous alkaline phase was separated while hot (ca 90°C.) from the small amount of black tarry by-product, cooled to 50°–60°C., and acidified with 75 grams (0.76 mole) of 37 percent hydrochloric acid. When the solution had been cooled to 25°–30°C., the precipitated 5,7-dichloroindazole was separated by filtration, washed with three 100 gram portions of water, and air-dried at 80°–85°C. There was obtained 88.7 grams (0.45 mole) of 5,7-dichloroindazole which melted at 196°–198°C. and contained 45.4 percent C; 2.05 percent H; 14.5 percent N; and 38.1 percent Cl (calculated for $C_7H_4N_2Cl_2$: 45.0 percent C; 2.14 percent H; 15.0 percent N; and 38.0 percent Cl).

EXAMPLE 2

The procedure described in Example 1 was repeated except that the diazonium salt solution (0.50 mole basis) was added with stirring at 80°–90°C. to an acetate buffer solution prepared from 33 grams (0.55 mole) of glacial acetic acid, 21.2 grams (0.53 mole) of sodium hydroxide, and 150 grams of water. Throughout the addition, the buffer system was maintained at a pH of 5.0 to 6.0 by the addition of 50 percent sodium hydroxide solution. A total of 327 grams (4.10 moles) of 50 percent sodium hydroxide solution was added. The product was isolated and purified by the procedures described in Example 1. A 92 percent yield of 5,7-dichloroindazole was obtained.

EXAMPLE 3

To a solution of 53.5 grams (0.50 mole) of o-toluidine in 150 grams of glacial acetic acid at 50°–60°C. was added 53.0 grams (0.52 mole) of acetic anhydride. This mixture was heated at 70°–75°C. for 15 minutes to form a solution containing acet-o-toluidide. Chlorine was bubbled ar the rate of 30 grams per hour through the acet-o-toluidide solution which was maintained at 70°–75°C. for 2.5–3.5 hours to add an average of 2.0 gram atoms of chlorine per mole of toluidine. The chlorination mixture was then distilled to a pot temperature of 135°C. to recover 125 grams of acetic acid. To the residue was added 360 grams (2.94 moles) of 80 percent sulfuric acid over 5 to 10 minutes at 135°–140°C. The mixture was stirred for 15 minutes at this temperature, cooled to 90°–100°C., and diluted with 216 grams of water. When the resulting suspension of the bisulfate of dichloro-o-toluidine was used in the procedure described in Example 1, there was obtained 76.7 grams (81 percent yield) of a dichloroindazole product that melted at 178°–185°C. and that was shown by gas chromatographic analysis to contain about 75 percent of 5,7-dichloroindazole and small amounts of other chloroindazoles.

EXAMPLE 4

The procedure described in Example 1 was used to prepare 7-chloroindazole from 2-amino-3-chlorotoluene. There was obtained an 85 percent yield of 7-chloroindazole which melted at 135°–137°C. and which contained 55.3 percent C, 2.90 percent H, 17.9 percent N, and 24.3 percent Cl (calculated for $C_7H_5N_2Cl$: 55.1 percent C; 3.28 percent H; 18.4 percent N; and 23.3 percent Cl).

EXAMPLE 5

A solution of 21.6 grams (0.20 mole) of o-toluidine in 100 grams of glacial acetic acid was brominated by the addition of 85 grams (0.53 mole) of bromine over a period of one hour during which the reaction temperature was allowed to rise to 60°C. The reaction mixture was diluted with 300 grams of water which contained sufficient sodium bisulfate to effect decolorization by reduction of the unreacted bromine. The product was isolated by filtration, washed free of acidity with small portions of water, and dried under reduced pressure at room temperature. There was obtained 51.0 grams of a product that was shown by gas chromatography to contain 76 percent of 2-amino-3,5-dibromotoluene. This product melted at 39°–41°C. and contained 59.2 percent Br (calculated for $C_7H_7NBr_2$: 60.2 percent Br). The yield of 2-amino-3,5-dibromotoluene was 92.4 percent.

The dibrominated o-toluidine product was dissolved in 800 grams (1.18 moles) of 15 percent sulfuric acid and diazotized by the addition of a solution of 14 grams (0.20 mole) of sodium nitrite in 20 grams of water at 5°–10°C. over a period of 2 hours. The ring closure and subsequent processing steps described in Example 1 were carried out. There was obtained 48.2 grams of the dibromoindazole which melted at 195°–197°C. and which contained 57.7 percent Br (calculated for $C_7H_4N_2Br_2$: 58.0 percent Br), and which was shown by gas chromatography to contain 95 percent of 5,7-dibromoindazole. The overall yield of dibromoindazole from o-toluidine was 83 percent.

EXAMPLE 6

A solution of 38 grams (0.25 mole) of 2-amino-4-nitrotoluene in 150 grams (1.47 moles) of 96 percent sulfuric acid was diluted by the dropwise addition of 150 grams of water at 30°–60°C. The resulting suspension was diazotized by adding to it over a period of about one hour a solution of 18 grams (0.26 mole) of sodium nitrite in 100 grams of water. During the addition of the sodium nitrite solution, the temperature of the reaction mixture was maintained at 5°–10°C. The diazonium salt solution was stirred at 5°C. for one hour and then added over a period of one hour to a solution of 900 grams (3.35 moles) of disodium hydrogen phosphate heptahydrate in 900 grams of water, which was maintained at 65°–75°C. during the addition of the diazonium salt solution. When the addition had been completed, the pH of the reaction mixture was 5.5. The reaction mixture was cooled to room temperature. The yellow precipitate that formed was isolated by filtration, washed with water until it was free of salts, and air-dried at 90°–100°C. There was obtained 39.6 grams (97 percent yield) of pure (100 percent assay) 6-nitroindazole. The structure of the product was confirmed by comparison of its infra-red spectrum with that of an authentic sample of 6-nitroindazole.

EXAMPLE 7

The procedure described in Example 6 was repeated except that the diazonium salt solution was added to a 50 percent aqueous solution that contained 3.35 moles of sodium acetate. There was obtained a 98 percent yield of pure (100 percent assay) 6-nitroindazole.

COMPARATIVE EXAMPLE A

The procedure described in Example 6 was repeated except that the diazonium salt solution was added to 900 grams of water. There was obtained a 23 percent yield of a product that contained 29 percent of 6-nitroindazole.

COMPARATIVE EXAMPLE B

The procedure described in Example 6 was repeated except that the diazonium salt solution was added to a 50 percent aqueous solution that contained 3.35 moles of sodium dihydrogen phosphate. There was obtained a 65 percent yield of a product that contained 76 percent of 6-nitroindazole.

EXAMPLE 8

2-Amino-4-nitrotoluene (38 grams, 0.25 mole) was heated with a mixture of 30 grams (0.29 mole) of 96 percent sulfuric acid and 200 grams of water at 90°–100°C. until complete solution was effected. This solution was cooled to obtain a suspension of nitrotoluidine bisulfate, which was then diazotized at 5°–20°C. with 18 grams (0.26 mole) of sodium nitrite in 50 grams of water. The resulting diazonium salt solution was stirred for 1 hour at 5°C. and then filtered.

One half of the filtrate was added over a period of 30 minutes to a solution of 34 grams (0.25 mole) of sodium acetate trihydrate in 100 grams of water, which was maintained at 60°–70°C. After the addition of a solution containing 4 grams (0.1 mole) of sodium hydroxide in 25 grams of water to regenerate the sodium acetate, the remainder of the filtrate was added over a period of 30 minutes. The precipitate that formed was isolated by filtration, washed with water until it was salt-free, and air-dried at 90°–100°C. There was obtained 35 grams (86 percent) yield of pure (100 percent assay) 6-nitroindazole.

EXAMPLE 9

A solution of 53.2 grams (0.35 mole) of 2-amino-4-nitrotoluene in 292 grams of 96 percent sulfuric acid was diluted with 290 grams of water. The resulting suspension of nitrotoluidine bisulfate was diazotized at 5°–10°C. with a solution of 25 grams (0.36 mole) of sodium nitrite in 50 grams of water. The diazonium salt solution was stirred at 5°C. for one hour and then filtered. The filtrate was added dropwise with stirring to a phosphate buffer system at pH 7, which had been prepared by mixing 30 grams of 85 percent phosphoric acid with 38 grams of 50 percent sodium hydroxide solution and 150 grams of water. The temperature of the reaction mixture was maintained at 70°–75°C. during the addition of the diazonium salt solution. The addition of the diazonium salt solution was discontinued when the pH of the mixture had fallen to about 6. Then 50 percent sodium hydroxide solution was added dropwise with stirring until the pH of the mixture reached 7 in order to regenerate the phosphate buffer system. The alternate addition of the diazonium salt solution and the 50 percent sodium hydroxide solution to maintain the pH of the reaction mixture in the range of 6 to 7 was continued until all of the diazonium salt solution had been added. This required about 1.5 hours.

The reaction mixture was stirred at 90°C. for a few minutes and then cooled to room temperature and filtered. The product was washed with water until it was free of salts and air-dried at 90°–100°C. There was obtained 55.3 grams (90 percent yield) of a product that contained 93 percent of 6-nitroindazole.

EXAMPLE 10 o-Toluidine (37.5 grams; 0.35 mole) was added dropwise with stirring to 194 grams of 96 percent sulfuric acid which was maintained at 15°–20°C. The resulting solution was cooled to 5°–10°C. and maintained at this temperature for 1.5 hours while 26 grams of 90 percent nitric acid was added to it. The nitration mixture was diluted with stirring with 110 grams of water and the resulting slurry of the bisulfate salt of 2-amino-4-nitrotoluene in aqueous sulfuric acid was diazotized by the procedure described in Example 1. The diazonium salt solution was added to a 50 percent aqueous solution that contained 3.35 moles of sodium acetate at 60°–70°C. The reaction mixture was cooled and filtered. After washing with water and air drying at 90–100°C. there was obtained in a 79 percent yield a product that contained 89 percent of 6-nitroindazole.

EXAMPLE 11

Crude 2-amino-4-nitrotoluene, prepared by the procedure of Example 10, was diazotized by the procedure described in Example 6. The diazonium salt solution was stirred for one hour at 5°C. and then filtered. The filtrate was added dropwise with stirring to a phosphate buffer system at pH 7, which had been prepared by mixing 30 grams of 85 percent phosphoric acid and 38 grams of 50 percent sodium hydroxide solution with 150 grams of water. The temperature of the reaction mixture was maintained at 70°–75°C. during the addition of the diazonium salt solution. The addition of the diazonium salt solution was discontinued when the pH of the mixture had fallen to about 6. Then 50 percent sodium hydroxide was added dropwise with stirring until the pH of the mixture reached 7. The alternate addition of the diazonium salt solution and the sodium hydroxide solution to maintain the pH of the reaction mixture between 6 and 7 was continued until all of the diazonium salt solution had been added.

The reaction mixture was stirred at 90°C. for a few minuted and then cooled to room temperature and filtered. After water-washing and air-drying, there was obtained a 79 percent yield of a product that contained 85 percent of 6-nitroindazole.

COMPARATIVE EXAMPLE C

The procedure described in Example 7 was repeated except that the sodium acetate solution was added to the diazonium salt solution and the reaction mixture was heated to 90°C. before the product was isolated. There was obtained a 71 percent yield of a product that contained 75 percent of 6-nitroindazole.

COMPARATIVE EXAMPLE D

The procedure described in Example 11 was repeated except that the phosphate buffer system was added to the diazonium salt solution. There was obtained a 45 percent yield of a product that contained 48 percent of 6-nitroindazole.

COMPARATIVE EXAMPLE E

2-Amino-4-nitrotoluene was diazotized by the procedure described in Example 6. The resulting diazonium salt solution was heated at 90°C. for 1 hour and then cooled to room temperature. The product obtained from the reaction mixture contained an appreciable amount of nitrocresol and little or no 6-nitroindazole.

EXAMPLE 12

Using the procedure described in Example 6, a product that contained 85 percent of 5-nitroindazole was prepared in a 77 percent yield from 2-amino-5-nitrotoluene.

EXAMPLE 13

Using the procedure described in Example 1, 4-chloroindazole was prepared from 2-amino-6-chlorotoluene, 5-chloroindazole was prepared from 2-amino-5-chlorotoluene, and 6-chloroindazole was prepared from 2-amino-4-chlorotoluene. In each case the yield of the chloroindazole was low.

Each of the other substituted indazoles herein disclosed can be prepared in a similar manner from the appropriate substituted o-toluidine.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. In the process for the production of indazoles having the structural formula

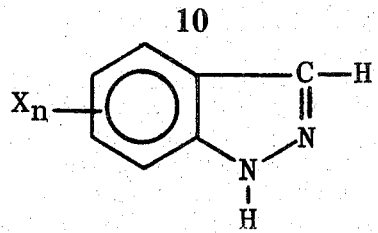

wherein X represents halogen, nitro, $-SO_2R$, cyano, acoyl, acoylamino, aroylamino, alkyl, alkoxy, carboalkoxy, $-COR$, $-CHO$, or trihalomethyl; R represents monoalkylamino, dialkylamino, hydroxy, halogen, alkyl, haloalkyl, phenyl, or substituted phenyl wherein the substituent is halogen, alkyl, or nitro; and $n$ represents a number in the range of 1 to 4, in which a substituted o-toluidine having the structural formula

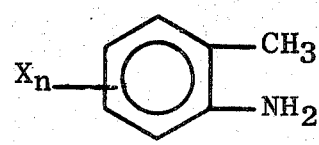

wherein X and $n$ have the aforementioned significance, is diazotized by adding an aqueous solution of sodium nitrite to a suspension containing a substantially equimolar amount of a salt of said substituted o-toluidine in an aqueous mineral acid medium at a temperature below 10°C. thereby forming a solution of the diazonium salt of said o-toluidine in aqueous mineral acid and converting said diazonium salt to the corresponding indazole, the improvement that comprises adding the solution of said diazonium salt in aqueous mineral acid to an aqueous solution that contains a stoichiometric excess of an alkali metal salt of a water-soluble acid having a dissociation constant in the range of $1 \times 10^{-8}$ to $1 \times 10^{-5}$ while maintaining the temperature of the reaction mixture between 10°C. and 100°C. and its pH between 4 and 10.

2. The process of claim 1 wherein the substituted o-toluidine is dissolved in an aqueous mineral acid medium that contains 2 moles to 10 moles of mineral acid per mole of o-toluidine and the resulting solution is diluted with water to form a suspension of the acid salt of the o-toluidine in said medium.

3. The process of claim 1 wherein the suspension of the salt of the substituted o-toluidine in aqueous mineral acid medium is formed by heating the o-toluidine with an amount of an aqueous mineral acid that contains 1 mole to 3 moles of the acid per mole of the o-toluidine until complete solution is effected, and the resulting solution is cooled to form a suspension of the acid salt of the o-toluidine in the aqueous mineral acid medium.

4. The process of claim 1 wherein the reaction mixture is maintained at 60° to 100°C. during the addition of the diazonium salt solution to the aqueous alkali metal salt solution.

5. The process of claim 1 wherein the diazonium salt solution is added to an aqueous solution that contains at least 0.3 mole of said salt of a water-soluble acid per mole of diazonium salt in the solution.

6. The process of claim 1 wherein the diazonium salt solution is added in at least two portions to an aqueous solution that contains about 1 mole to 2 moles of the alkali metal salt of the water-soluble acid per mole of diazonium salt in said solution and after the addition of each portion an amount of an alkaline solution that is equivalent to the amount of diazonium salt that has been added is added to the reaction mixture to regenerate the alkali metal salt, a stoichiometric excess of said alkali metal salt being present in the reaction mixture throughout the addition of the diazonium salt solution.

7. The process of claim 1 wherein the substituted o-toluidine that is diazotized has the structural formula

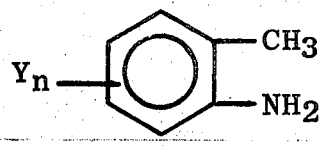

wherein Y represents a strongly electronegative substituent and $n$ represents a number in the range of 1 to 4.

8. The process of claim 1 wherein the substituted o-toluidine is 2-amino-4-nitrotoluene.

9. In the process for the production of indazoles having the structural formula

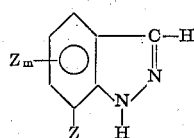

wherein each Z represents a weakly electronegative substituent or an electropositive substituent and $m$ represents a number in the range of 0 to 3, in which a substituted o-toluidine having the structural formula

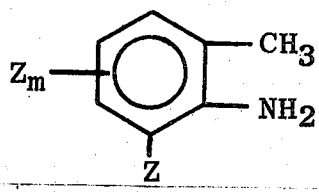

wherein Z and $m$ have the aforementioned significance, is diazotized by adding an aqueous solution of sodium nitrite to a suspension containing a substantially equimolar amount of a salt of said o-toluidine in an aqueous mineral acid medium at a temperature below 10°C. thereby forming a solution of the diazonium salt of said o-toluidine in the aqueous mineral acid and converting said diazonium salt to the corresponding indazole, the improvement that comprises adding the solution of the diazonium salt in aqueous mineral acid to an aqueous solution that contains a stoichiometric excess of an alkali metal salt of a water-soluble acid having a dissociation constant in the range of $1 \times 10^{-8}$ to $1 \times 10^{-5}$ while maintaining the temperature of the reaction mixture between 10°C. and 100°C. and its pH between 4 and 10.

10. The process of claim 9 wherein each Z represents halogen.

11. The process of claim 9 wherein m represents a number in the range of 1 to 3.

12. The process of claim 9 wherein the substituted o-toluidine is 2-amino-3,5-dichlorotoluene.

13. The process of claim 9 wherein the substituted o-toluidine is 2-amino-3,5-dibromotoluene.

14. The process of claim 9 wherein the reaction mixture is maintained at 60°C. to 80°C. while the diazonium salt solution is being added to the aqueous alkali metal salt solution.

15. The process of claim 9 wherein the diazonium salt solution is added to an aqueous sodium acetate solution that contains 1 mole to 20 moles of sodium acetate per mole of diazonium salt in said solution.

16. The process of claim 9 wherein the diazonium salt solution is added to an aqueous phosphate buffer system at pH 7 that contains 1 mole to 20 moles of phosphate per mole of diazonium salt in said solution.

17. The process of claim 9 wherein the diazonium salt solution is gradually added to an aqueous solution that contains about 1 mole to 2 moles of an aqueous phosphate buffer system at pH 7 per mole of said diazonium salt until the pH of the reaction mixture reaches about 6, aqueous alkaline solution is added to the reaction mixture until its pH reaches 8, and the alternate addition of diazonium salt solution and alkaline solution to maintain the pH of the reaction mixture between 5 and 8 is continued until all of the diazonium salt solution has been added.

18. The process of claim 9 wherein the diazonium salt solution and an aqueous alkaline solution are added simultaneously to an aqueous solution that contains about 1 mole to 2 moles of an aqueous phosphate buffer at pH 7 per mole of said diazonium salt at such rates that the pH of the reaction mixture is maintained between 5 and 8.

19. The process of claim 9 wherein the diazonium salt solution is added to an aqueous solution that contains 5 moles to 15 moles of sodium acetate per mole of diazonium salt in said solution.

20. The process of claim 1 wherein the diazonium salt solution is added to an aqueous solution that contains 5 moles to 15 moles of disodium hydrogen phosphate per mole of diazonium salt in said solution.

21. The process for the production of 5,7-dichloroindazole that comprises the steps of
   a. forming a suspension of 2-amino-3,5-dichlorotoluene bisulfate in aqueous sulfuric acid, said suspension containing 1 mole to 10 moles of sulfuric acid per mole of said bisulfate;
   b. adding to suspension at 5°C. to 10°C. an aqueous solution of sodium nitrite, thereby forming an aqueous solution of the diazonium salt of 2-amino-3,5-dichlorotoluene;
   c. adding said diazonium salt solution to an aqueous solution that contains about 1 mole to 20 moles per mole of said diazonium salt of an alkali metal salt of a water-soluble acid having a dissociation constant in the range of $1 \times 10^{-8}$ to $1 \times 10^{-5}$ while maintaining the temperature of the reaction mixture between 60°C. and 100°C. and its pH between 5 and 8 thereby forming 5,7-dichloroindazole; and
   d. isolating 5,7-dichloroindazole.

22. The process of claim 21 wherein in Step (c) the reaction mixture is maintained at 60°C. to 80°C. during the addition of the diazonium salt solution.

23. The process of claim 21 wherein in Step (c) the diazonium salt solution is added to an aqueous solution that contains 5 moles to 15 moles of sodium acetate per mole of diazonium salt in said solution.

24. The process of claim 21 wherein in Step (c) the diazonium salt solution is added in at least two portions to an aqueous solution that contains about 1 mole to 2 moles of alkali metal salt per mole of diazonium salt in said solution and after the addition of each portion the alkali metal salt is regenerated by adding to the reaction mixture an amount of sodium hydroxide that is equivalent to the amount of the diazonium salt that has been added, a stoichiometric excess of alkali metal salt being present in the reaction mixture throughout the addition of the diazonium salt solution.

25. The process of claim 21 wherein in Step (c) the diazonium salt solution is added gradually to an aqueous solution that contains about 1 mole to 2 moles per mole of a phosphate buffer system while the pH of the reaction mixture is maintained within the range of 6.0 to 8.0 by the intermittent addition of aqueous sodium hydroxide solution.

* * * * *

UNITED STATES PATENT OFFICE
CERTIFICATE OF CORRECTION

Patent No. 3,843,678         Dated Oct. 22, 1974

Inventor(s) Eugene P. DiBella

It is certified that error appears in the above-identified patent and that said Letters Patent are hereby corrected as shown below:

The Abstract, line 10, change "—$8O_2R$" to -- —$SO_2R$ --.

Column 6, line 8, change "ar" to -- at --.

Signed and sealed this 24th day of December 1974.

(SEAL)
Attest:

McCOY M. GIBSON JR.          C. MARSHALL DANN
Attesting Officer            Commissioner of Patents